United States Patent [19]

Green et al.

[11] 4,059,538

[45] Nov. 22, 1977

[54] METHOD FOR PREPARING GRANULATED DETERGENT FORMULATIONS

[75] Inventors: Robin John Green; Richard Shaw Johnson, both of Wirral; John Kenneth Potter, Wallasey, all of England

[73] Assignee: Lever Brothers Company, New York, N.Y.

[21] Appl. No.: 662,772

[22] Filed: Mar. 1, 1976

Related U.S. Application Data

[63] Continuation of Ser. No. 408,125, Oct. 19, 1973, abandoned.

[30] Foreign Application Priority Data

Oct. 20, 1972   Canada .................................... 48420

[51] Int. Cl.² ............................................. C11D 7/54
[52] U.S. Cl. ....................................... 252/95; 252/99; 252/DIG. 11; 23/313 R; 23/313 AS; 23/313 FB; 264/117

[58] Field of Search ................... 252/99, 95, DIG. 11; 23/313, 313 AS, 313 FB; 264/117

[56] References Cited

U.S. PATENT DOCUMENTS 2,414,969   1/1947   Moose ................................... 252/175
3,285,859   11/1966   Jelen ....................................... 23/313

FOREIGN PATENT DOCUMENTS 8,684   10/1967   Japan ....................................... 252/99

*Primary Examiner*—Mayer Weinblatt
*Attorney, Agent, or Firm*—Kenneth F. Dusyn; James J. Farrell; Melvin H. Kurtz

[57] ABSTRACT

Detergent formulations are granulated commercially by spray drying a slurry of the formulation. There is now proposed a method in which the components in powder form are granulated with a binder in a substantially horizontal annular rotating bed. The binder may be released by the action of the rotating bed.

8 Claims, No Drawings

METHOD FOR PREPARING GRANULATED DETERGENT FORMULATIONS

This is a continuation, of application Ser. No. 408,125, filed Oct. 19, 1973, now abandoned.

This invention relates to the granulation of detergent formulations. When a solid detergent formulation is prepared for marketing it is usual to form it into a granular solid prior to packaging. Commercially used methods of preparing these granulates are spray drying, spray cooling and dry mixing. The object of these methods is to form granules having a diameter from about 0.3 mm to about 3.00 mm. These methods may be used in combination; thus an ingredient may be dry mixed into a spray dried product. Other proposals have been made for example Marshalls U.S. Pat. No. 3,588,950.

This invention provides a method of granulating a detergent formulation to form granules preferably in the range from about 0.3 mm to about 3.0 mm from the components, in powder form, wherein the components are formed into a substantially horizontal annular rotating bed in contact with a liquid binder, preferably released from a component during rotation, in an apparatus comprising a roughened rotating table within a smooth walled cylinder. The binder may be added to the formulation components before or, preferably, during rotation in the annular bed, but a particular feature of the process is the release of a binder material from the formulation components during rotation. The particles will have a motion relative to each other and the containing vessel. Some granules formed may be outside the desired size range but will be usable as a commercial product.

Possible mechanisms leading to release of the binder would be the temperature rise in the bed, which would, for example, release water from a hydrate or melt a low melting point solid, or mechanical forces acting on liquid/porous solid system. An example of the latter would be a liquid nonionic detergent active material absorbed on porous solid particles. The liquid used in the granulation step can remain in the particles after formation thereof, or can be allowed to evaporate. The liquid used may solidify at room temperature, or in the final particles formed it could be absorbed on the solid material or bound as a hydrate. The liquid may have a specific binder effect on the solid particles. The liquid used must be chemically compatible with the solid material. There exists the possibility of performing the granulation at the same time as the chemical reaction occurs between the solid material and the liquid used. Thus a neutralization reaction could be performed while the solid material is being granulated.

The main advantage of the process of the invention is the rapidity of granulation. The process provides particles of relatively narrow size distribution and with close composition tolerances. The treatment effected on the solid material during granulation is substantially constant, in that the material moves peripherally round an axis in a closed circle. Because of this consistent treatment of the particles in the machine is efficient in the use of power in producing the granulate. The process allows the formation of a substantially spherical end-product, having a negligible proportion of fines, in a simple manner. The process can be performed at ambient temperature, but the machine is adaptable to allow high temperature granulation to be achieved with the aid of suitable jacketing and heating means. The process can be performed at lower than ambient temperatures also. Under normal operating conditions the temperature increase in the machine due to processing is relatively small. Thus commencing processing at ambient temperature, the temperature rise above this level is relatively low compared with heat methods, for example spray drying. However the temperature rise is sufficient for in situ binder release. Materials which are adversely affected by higher temperatures can therefore be included in the single granulation operation. During the processing the size of the end-product particles can be classified by having an over-flow system in the machine. The process of the invention also allows the incorporation of materials susceptible to decomposition by water, e.g., a percarbonate, and hence not able to be included in a slurry process. Such an over-flow system would allow bleed-off of particles above the specific size. Means may be provided in the machine to ensure that the solid material does not cake onto the moving or stationary parts of the machine during processing.

The apparatus used in the process of the invention comprises a preferably vertically arranged smooth sidewall, for example a cylinder, having concentrically positioned within it a rotatable roughened, preferably horizontal, table. This table is rotatable about the central axis of the side-walls so that relative motion occurs between the table and the side-wall. The degree of roughening on the table is selected for a particular process and the table is spaced from the side-walls by a small amount, the roughening may be that arising from manufacture. An apparatus of this type is made by Fuji Paudal KK (formerly Fuji Denki Kogyo KK) of Japan, under the trade name of "Marumerizer." This apparatus is described in German Patent No. 1294 351 and U.S. Pat No. 3,277,520 (now reissued as No. 27 214) as well as Japanese published specification No. 8684/1967. In the latter specification there is described a method of granulating powders with the aid of a binder in a machine having a horizontal rotor at the bottom of a smooth vertical cylinder. It is surprising that all or some of the components of a detergent formulation can be granulated in such a device. In particular the generation of the binder material in situ is not disclosed in this previous disclosure.

The present invention allows a formulation to be granulated in a single stage (containing materials, for example sodium perborate, which are usually dry dosed, that is added after spray drying). In the process of the invention, the powdered solid material to be granulated is placed within the working volume of a machine described previously and after commencing rotation of the roughened table the liquid material is added continuously. There is no limitation on the method of adding the liquid, i.e., it can be sprayed, poured continuously, or added batchwise, for example. In some cases it may be advisable to mix part of the liquid with the solid material before the latter is placed in the working volume. In such cases the powder placed in the machine should still have free-flowing properties.

For some applications it is desirable to have a granule containing layers of components, i.e., different components are formed in layers around a central core of a certain component. When placed in a liquid medium such granules provide a sequential release of the different components as they dissolve in the liquid. The process of the invention allows such granules to be made in any easy manner. After preparing a basic granule containing one component, the second component will be formed as a layer on the core by repeating the process. The basic granule is left in the working volume and the second component in powdered form is added. On repeating the process with additional further liquid a composite granule containing two components, one as a layer on the other, is formed. This build-up on the granule can be repeated using further components. The process may also be used to reduce the proportion of fines in an already granulated product. The detergent formulation to which the present invention applies will contain a detergent active. This active, or mixture of actives, will be taken from the known groups of anionic, cationic, nonionic, amphoteric and zwitterionic actives. Examples of commercially known actives are alkaryl sulphonates, e.g., dodecyl benzene sulphonate, $C_{10}$–$C_{20}$ alkyl sulphates, sulphonated olefines ($C_{10}$–$C_{20}$), ethoxylated (5EO to 9EO) alcohols ($C_{10-18}$) which latter may be branched or straight chain, salts of long chain fatty acids ($C_{10}$–$C_{20}$). The usual salts are the sodium salts, but potassium, ammonium and other water soluble salts are usable. Examples of the actives are quoted in "Surface Active Agents and Detergents" volume II (1958) by Schwartz, Perry and Berch. A liquid detergent active may be used as the binder material.

Detergency builders may also be present, examples are precipitant builders which form insoluble calcium salts, for example sodium orthophosphate, carbonates and sodium alkyl and alkenyl succinates, sulphonated fatty acid salts, and malonates and also sequestrant builders which can be either organic or inorganic, for example sodium hydrofuran tetracarboxylate, sodium pyrophosphate, sodium nitrilotriacetate, sodium ethylene diamine tetraacetate, sodium citrate, sodium tartrate, sodium malate, trisodium carboxymethyloxysuccinate, sodium oxydiacetate, sodium oxydisuccinate, and also polyelectrolyte builders such as sodium polyacrylate and copolyethylene maleate.

Alkaline salts, for example sodium silicates, may also be present.

Bleaching materials, for example active oxygen releasing compounds, e.g., perborates, percarbonates, may be present; preferably in an amount from about 5 to about 30%. Other additives which are normally present in relatively small amounts are antiredeposition agents, perfumes, fluorescers, germicides.

The detergent formulation will preferably contain from about 5 to about 30% by weight of a detergent active material and a detergency builder material in the same range. The amount of active may be outside these limits for specific formulations, that is from about 2 to about 40% by weight. The amount of detergency builder may also be outside this preferred range, that is from about 5 to about 60% by weight; the larger amounts of builder would be used with formulations intended for relatively low in-use concentrations, for example, fabric washing.

Examples of the process of the invention will now be given.

The apparatus used was a Marumerizer having a flat horizontal table with cylindrical side walls. The diameter was 23 cm. The rotatable table was milled with two sets of grooves, each comprising 1 mm deep grooves with 2 mm spacing, set at right angles.

EXAMPLE 1

The following components were mixed and placed in the apparatus
Alkyl benzene sulphonate 130 gms,
Sodium toleune sulphonate 12 gms,
Coconut ethanolamide 12 gms,
Sodium metasilicate pentahydrate 94 gms,
Sodium tripolyphosphate hexahydrate 249 gms,
Sodium sulphate decahydrate 36 gms,
Sodium carboxymethyl cellulose 3 gms,
Fluorescers 3.5 gms,
Sodium perborate tetrahydrate 138 gms.

The rotatable table was set in motion at 1160 rpm and after 5 min granulation was complete and the product was discharged.

The specific component of this formulation which caused granulation was found to be the sodium sulphate decahydrate. This hydrate released water which acted as the binder. The average particle size of the ingredients before processing was less than 0.2 mm and after processing the average particle size was 1 mm. The specific advantage of the process in the example is that the sodium perborate can be incorporated directly in the detergent formulation without a subsequent mixing stage as is necessary in a conventional spray drying process.

EXAMPLE 2

The ingredients of this example were the same as those for example 1 with the exception of the sodium metasilicate pentahydrate which was replaced by 54 gms of anhydrous sodium silicate powder. The ingredients with the exception of this sodium silicate powder were changed into the working volume of the apparatus and the rotatable table set in motion. After 5 mins at 1160 rpm granulation occurred. The speed of rotation of the table was then reduced to 350 rpm and the anhydrous sodium silicate added to the bed of granules. After 1 min the product was discharged.

This example demonstrates how sequential release can be obtained from the process. When the product of the example is dissolved in water an initial pH is obtained as the sodium silicate dissolves and the pH then drops as the rest of the ingredients are dissolved. A pH profile of this type in the wash is of use, for example, in the presence of catalase-containing soils. Catalase is known to deactivate sodium perborate. However, the catalase is deactivated by high pH conditions. If these can be provided before the sodium perborate passes into the solution then economic usage of the perborate is possible.

EXAMPLE 3

The following components were mixed and placed in the apparatus.
Dodecyl benzene sulphonate 36 gms,
Tallow alcohol 18EO 36 gms,
Anhydrous tallow soap 36 gms,
Sodium silicate powder anhydrous 26 gms,
Sodium tripolyphosphate anhydrous 198 gms,
Sodium sulphate anhydrous 48 gms,
Sodium carboxymethyl cellulose 12 gms,
Fluorescers 3 gms,
Sodium toluene sulphonate 9 gms,
Sodium percarbonate tetrahydrate 150 gms The table is set in motion at 1160 rpm and after 7 min granules (0.5 to 1.5 mm) are formed. In this example the specific component which causes granulation is the nonionic active tallow alcohol 18 EO. The product of this example has exceptionally good free flowing properties.

EXAMPLE 4

Example 1 was repeated using anhydrous sodium sulphate (16 gms) in place of the decahydrate and adding 50 mls of water to effect granulation. The end product was the same as that formed in Example 1.

EXAMPLE 5

A dishwashing formulation with the following formulation was prepared by granulation in a Marumerizer previously described

| | |
|---|---|
| Block copolymer of polyethyle (M.Wt 1750) and polyoxypropylene in ratio 9:1 | 10 gms |
| Sodium tripolyphosphate hydrate | 522 gms |
| Sodium metasilicate (anhydrous) | 425 gms |
| Water | 18 gms |

The metasilicate, which was in the form of granules was charged into the Marumerizer which was set in motion at 1160 rpm. The powdered tripolyphosphate was then added with the water which acted as a binder. The product formed granules which remained free flowing after 8 weeks storage at 37° C/70% humidity. A bleaching agent, for example potassium dichloroisocyanuric acid (25 gms), may be added. The average particle diameter was 2.5 mm and the product was within the desired range.

EXAMPLE 6

A fabric washing formulation having a relatively high nonionic active content was granulated in a Marumerizer. The formulation was:

| | |
|---|---|
| Sodium carbonate (anhydrous) | 330 gms |
| Tergitol 15-S-9 | 110 gms |
| Sodium metasilicate pentahydrate | 88 gms |
| Sodium carboxy methyl cellulose | 3 gms |
| Ethylene maleic anhydride copolymer (low viscosity grade) | 3 gms |

The carbonate, metasilicate and cellulose components were placed in the Marumerizer vessel and the baseplate rotated at 350 rpm while the nonionic active (Tergitol 15-S-9) was added to the rotating powder bed. The speed when then increased to 1160 rpm until a substantially spherical product of the required particle size was formed, this stage took about 4 minutes. The speed was then reduced to the lower value while the copolymer was poured on as a 20% w/w aqueous solution prior to discharge of the product. The total processing time was about 5 minutes. The process of granulation was repeated with the formulation containing 3 gms of the fabric fluorescer added to the initial charge. The copolymer is obtainable as EMA 11 from Monsanto Co.

EXAMPLE 7

A carbonate built formulation containing an amine oxide was granulated using a Marumerizer. The formulation was:

| | |
|---|---|
| N,N-dimethyl N-coco amine oxide (30% w/w solution in water) | 165 gms |
| Alfol 1412.8EO** | 165 gms |
| Alkaline silicate powder | 275 gms |
| Sodium carboxy methyl cellulose | 14 gms |
| Sodium carbonate (anhydrous) | 1705 gms |
| Ethylene maleic anhydride copolymer* (low viscosity grade) | 27 gms |
| Water (amine oxide solvent) | 385 gms |

*EMA 11
**Alfols are straight chain alcohols

The materials, with the exception of the copolymer, were mixed thoroughly to disperse the amine oxide active (Aromox DMCDW) and charged into a Marumerizer. The baseplate was rotated at 1160 rpm until the desired particle size was achieved after 9 mins (0.5–2.0 mm). A further 110 ml of water was added during the process. The speed was reduced to 500 rpm and the copolymer added as a 20% w/w aqueous solution. The product was then discharged.

We claim:
1. A method of granulating a detergent formulation containing from about 2 to about 40% by weight of detergent active material, and from about 5 to about 60% by weight of detergency builder material to form granules in the range from about 0.3 mm to about 3.00 mm from detergent components in powder form, wherein the detergent components are formed into a substantially horizontal annular rotation bed within an apparatus comprising a roughened rotating table concentrically displaced within a smooth walled cylinder, and contacted with a compatible liquid binder that is released from a component during rotation of the formed bed.

2. A method according to claim 1, wherein the binder is released by decomposition of a material due to heat produced in the rotating bed.

3. A method according to claim 2, wherein the binder is water released by decomposition of a hydrate.

4. A method according to claim 1, wherein the binder is formed into liquid by melting in the rotating bed.

5. A method according to claim 1, wherein the binder is released in the rotating bed by mechanical forces.

6. A method according to claim 1, wherein the detergent formulation contains
   from about 5 to about 30% of a detergent active material; and
   from about 5 to about 30% of a detergency builder material.

7. A method according to claim 1, wherein components of the formulation are granulated in sequence to form layered granules.

8. A method according to claim 1, wherein the detergent formulation contains from about 5 to about 30% by weight of an active oxygen releasing material.

* * * * *

UNITED STATES PATENT AND TRADEMARK OFFICE
CERTIFICATE OF CORRECTION

PATENT NO. : 4,059,538
DATED : November 22, 1977
INVENTOR(S) : Robin John Green et al.

It is certified that error appears in the above-identified patent and that said Letters Patent are hereby corrected as shown below:

Title Page; Foreign Application Priority Data:

"Oct. 20, 1972   Canada......................48420"

should read

-- Oct. 20, 1972   Great Britain................48420/72 --

In the Specification:

Col. 4, line 1: "toleune" should be -- toluene --.

Signed and Sealed this

Twenty-first Day of March 1978

[SEAL]

Attest:

RUTH C. MASON
Attesting Officer

LUTRELLE F. PARKER
Acting Commissioner of Patents and Trademarks